(12) United States Patent
Tanno et al.

(10) Patent No.: US 8,964,607 B2
(45) Date of Patent: Feb. 24, 2015

(54) COMMUNICATION SYSTEM, COMMUNICATION APPARATUS, AND COMMUNICATION METHOD

(75) Inventors: Motohiro Tanno, Yokohama (JP); Mamoru Sawahashi, Yokohama (JP); Seizo Onoe, Yokohama (JP); Nobuhiko Miki, Yokohama (JP); Yoshihisa Kishiyama, Yokosuka (JP); Hidekazu Taoka, Nerima (JP)

(73) Assignee: NTT DOCOMO, INC., Tokyo (JP)

( * ) Notice: Subject to any disclaimer, the term of this patent is extended or adjusted under 35 U.S.C. 154(b) by 498 days.

(21) Appl. No.: 12/989,673

(22) PCT Filed: Apr. 30, 2009

(86) PCT No.: PCT/JP2009/058505
§ 371 (c)(1),
(2), (4) Date: Dec. 30, 2010

(87) PCT Pub. No.: WO2009/133935
PCT Pub. Date: Nov. 5, 2009

(65) Prior Publication Data
US 2011/0261732 A1   Oct. 27, 2011

(30) Foreign Application Priority Data
May 2, 2008 (JP) ................................. 2008-120660

(51) Int. Cl.
*H04J 1/00* (2006.01)
*H04W 16/14* (2009.01)
(Continued)

(52) U.S. Cl.
CPC ............. *H04W 16/14* (2013.01); *H04L 5/0053* (2013.01)

USPC ........... 370/281; 370/277; 370/278; 370/280; 370/319; 370/328; 370/329; 370/330; 455/552.1; 455/553.1; 455/432.3; 455/432.2; 455/436

(58) Field of Classification Search
CPC ............................ H04W 72/044; H04W 16/14
USPC .......... 370/281, 276, 277, 329; 340/7.42, 1.1, 340/7.2; 375/360; 455/552.1, 553.1, 432.1, 455/432.3, 435.1, 435.2, 436
See application file for complete search history.

(56) References Cited

U.S. PATENT DOCUMENTS 7,688,926 B2 * 3/2010 Suh et al. ........................ 375/360
8,295,209 B2 * 10/2012 Chindapol et al. ............. 370/278
(Continued)

FOREIGN PATENT DOCUMENTS

CN    1855764 A    11/2006
CN    1946236 A    4/2007
(Continued)

OTHER PUBLICATIONS

International Search Report w/translation from PCT/JP2009/058505 dated Aug. 18, 2009 (3 pages).
(Continued)

*Primary Examiner* — Un C Cho
*Assistant Examiner* — Peian Lou
(74) *Attorney, Agent, or Firm* — Osha Liang LLP

(57) ABSTRACT

A communication apparatus to be used for a newer system employing an FDD scheme in an area where an older system and the newer system coexist. The communication apparatus includes a first communication unit communicating at least a downlink data channel of the newer system using a frequency band belonging to a first frequency range (3.4-3.8 GHz); and a second communication unit communicating at least an uplink control channel of the newer system using a frequency band belonging to a second frequency range (2 GHz band) lower than the first frequency range. The second frequency range is used for uplink and downlink communications in the older system.

6 Claims, 6 Drawing Sheets

(51) Int. Cl.
*H04B 7/00* (2006.01)
*H04B 7/005* (2006.01)
*H04J 3/00* (2006.01)
*H04B 7/204* (2006.01)
*H04W 4/00* (2009.01)
*H04L 5/00* (2006.01)

(56) References Cited

U.S. PATENT DOCUMENTS

| | | | |
|---|---|---|---|
| 8,483,697 B2 * | 7/2013 | Fischer et al. | 455/450 |
| 2005/0113089 A1 | 5/2005 | Bamburak et al. | |
| 2006/0171345 A1 | 8/2006 | Hildebrand et al. | |
| 2007/0082698 A1 * | 4/2007 | Su | 455/552.1 |
| 2007/0286156 A1 * | 12/2007 | Gormley et al. | 370/350 |

FOREIGN PATENT DOCUMENTS

| | | |
|---|---|---|
| JP | 2000-513536 A | 10/2000 |
| JP | 2006-304312 A | 11/2006 |
| WO | 98/01003 A2 | 1/1998 |

OTHER PUBLICATIONS

Written Opinion from PCT/JP2009/058505 dated Aug. 18, 2009 (3 pages).
3GPP TS 36.300 V8.4.0; "Evolved Universal Terrestrial Radio Access (E-UTRA) and Evolved Universal Terrestrial Radio Access Network (E-UTRAN) Overall description"; Mar. 2008 (126 pages).
Office Action for Chinese Application No. 2009801248302 dated Dec. 28, 2012, with English translation thereof (11 pages).
Espacenet Publication Abstract for CN1946236, publication date Apr. 11, 2007 (1 page).
Office Action in corresponding Chinese Application No. 200980124830.2 dated Jul. 16, 2013, with translation (17 pages).
Extended European Search Report in counterpart European Patent Application No. 09738872.2 mailed on Jun. 27, 2014 (6 pages).
Pei- Kai Liao et al; "FDD Frame Structure Supporting TDD-based Legacy Systems for P802.16m; C80216m-08 138"; pp. 1-7; Mar. 10, 2008 (7 pages).

* cited by examiner

COMMUNICATION SYSTEM, COMMUNICATION APPARATUS, AND COMMUNICATION METHOD

TECHNICAL FIELD

The present invention generally relates to mobile communication technologies. More particularly, the present invention relates to a communication system, a communication apparatus, and a communication method using a high-frequency wide band.

BACKGROUND ART

In the field of mobile communication, next-generation communication systems as successors to W-CDMA and HSDPA are being discussed by 3GPP, a standardization group. Examples of next-generation communication systems include a Long Term Evolution (LTE) system and an IMT-advanced system (fourth-generation mobile communication system). The IMT-advanced system (IMT-A) is also called the LTE advanced system (LTE-A).

In response to demand for high-speed communications, system bandwidths have been increased. For example, for downlink, a system bandwidth of 5 MHz is used in W-CDMA and a maximum system bandwidth of 20 MHz is used in LTE. In a successor system to LTE, it may be necessary to further increase the communication speed and the system bandwidth. For example, compared with LTE where a transmission rate of about 300 Mbps (downlink) is achieved using the bandwidth of 20 MHz, a much wider bandwidth of 100 MHz may be necessary to achieve a transmission rate of 1-2 Gbps. Also, such a wide frequency band is necessary for each telecommunications operator.

Meanwhile, to achieve continuous two-way communication, it is preferable to employ a frequency division duplex (FDD) scheme where separate frequency bands are used for uplink and downlink. In this case, a bandwidth corresponding to about 3% of the center frequency is used as a separating band (center gap) to sufficiently suppress interference between an uplink signal and a downlink signal. Since only high-frequency bands are available for future mobile communication systems, it is necessary to provide a wider center gap to employ an FDD scheme. Assuming that the center frequency is 3.6 GHz, a bandwidth as large as about 130 MHz is used for the center gap.

Also, the propagation loss (path loss) of a signal increases as the frequency becomes higher. For example, attenuation of a signal in a 3 GHz band is greater than that of a signal in a 2 GHz band by about 6 dB. Therefore, in a system using a high frequency band, the cell radius (or cell coverage) tends to become small. One approach to improve the signal quality is to increase the transmission power. However, it is not practical to increase the transmission power to such a level that the above problem can be solved. Particularly, compared with a base station, it is difficult to increase the transmission power of a user device.

Roughly two types of channels are used in a mobile communication system: data channels and control channels. It is possible to improve the signal quality of a data channel to some extent by appropriately performing adaptive modulation and channel coding (AMC). However, unlike a data channel, it is difficult to effectively perform AMC to control the transmission rate of a control channel. Therefore, when considering the cell coverage, it is necessary to give more attention to control channels rather than to data channels.

DISCLOSURE OF INVENTION

Problems to be Solved by the Invention

In an area where an older system using a system frequency band with a basic bandwidth and a newer system using a system frequency band with a bandwidth wider than the basic bandwidth coexist, an aspect of the present invention makes it possible to improve the frequency efficiency while achieving desired cell coverage of the newer system.

Means for Solving the Problems

An aspect of the present invention provides a communication apparatus to be used for a newer system in an area where an older system and the newer system coexist. The older system uses a system frequency band with a basic bandwidth and the newer system uses a system frequency band wider than the basic bandwidth and employs a frequency division duplex scheme for communications. The communication apparatus includes a first communication unit communicating at least a downlink data channel of the newer system using a frequency band belonging to a first frequency range; and a second communication unit communicating at least an uplink control channel of the newer system using a frequency band belonging to a second frequency range lower than the first frequency range. The second frequency range is used for uplink and downlink communications in the older system.

According to another aspect of the present invention, a downlink control channel of the newer system may also be communicated using a frequency band belonging to the first frequency range; and an uplink data channel of the newer system may also be communicated using a frequency band belonging to the second frequency range.

According to still another aspect of the present invention, at least a part of downlink control channels of the newer system may also be communicated using a frequency band belonging to the second frequency range; and an uplink data channel of the newer system may also be communicated using a frequency band belonging to the first frequency range. The part of the downlink control channels may include one or more of a broadcast channel, a paging channel, and a random access channel.

Advantageous Effect of the Invention

In an area where an older system using a system frequency band with a basic bandwidth and a newer system using a system frequency band with a bandwidth wider than the basic bandwidth coexist, an aspect of the present invention makes it possible to improve the frequency efficiency while achieving desired cell coverage of the newer system.

BEST MODE FOR CARRYING OUT THE INVENTION

Although the present invention is described below using multiple embodiments, the distinctions between the embodiments are not essential for the present invention and the embodiments may be used individually or in combination. Although specific values are used in the descriptions below to facilitate the understanding of the present invention, the values are just examples and any other appropriate values may also be used unless otherwise mentioned.

Figure 1:
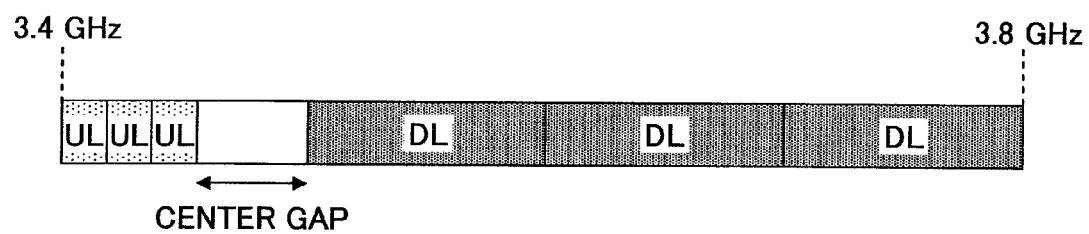
FIG. 1 is a drawing illustrating a case where a center gap is provided in the same frequency range.

FIG. 1 is a drawing illustrating a method of using frequency bands as a comparative example. In FIG. 1, it is assumed that there are first, second, and third mobile communication providers (hereafter, simply called "providers") providing mobile communication services using a frequency division duplex (FDD) scheme. Each provider uses one of frequency bands for downlink (DL frequency bands) indicated by "DL" and one of frequency bands for uplink (UL frequency bands) indicated by "UL". A frequency band (center gap) for preventing interference between uplink and downlink is provided between the three UL frequency bands and the three DL frequency bands. The three UL frequency bands, the three DL frequency bands, and the center gap are provided in the same frequency range. In this example, the frequency range is between 3.4 GHz and 3.8 GHz.

The frequency bands assigned to the providers are called basic bandwidths or system bandwidths. In other words, base stations of each provider use one basic bandwidth. The same basic bandwidth may be used for both uplink and downlink or different basic bandwidths may be used for uplink and downlink. Also, the provider may use the entire assigned basic bandwidth by itself or may divide the assigned basic bandwidth and assign the divided bandwidths to multiple telecommunications carriers.

The method of using frequency bands shown by FIG. 1 is provided as a comparative example from a technical point of view and is not necessarily in practical use.

Figure 2:
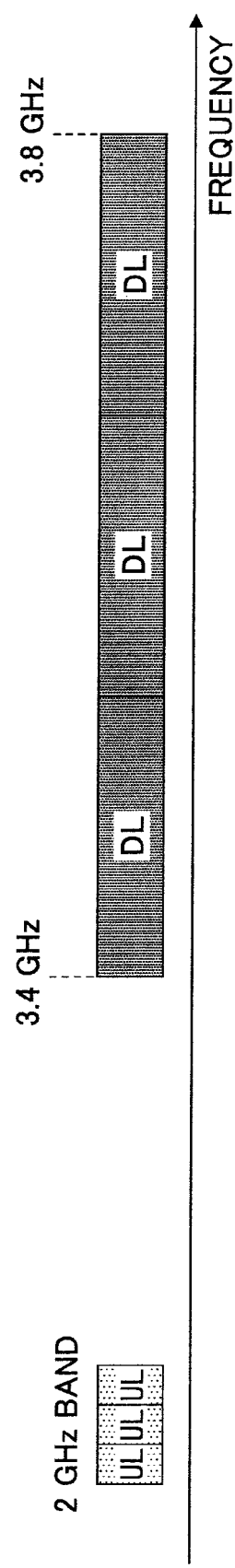
FIG. 2 is a drawing illustrating a method of using frequency bands according to a first embodiment of the present invention.

FIG. 2 is a drawing illustrating a method of using frequency bands according to an embodiment of the present invention. In this method, as in the method of FIG. 1, different bandwidths are used for uplink and downlink. This is because the amount of downlink communications is normally greater than the amount of uplink communications.

The method of FIG. 2 is different from the method of FIG. 1 in that UL frequency bands of the three providers are in a second frequency range different from a first frequency range containing DL frequency bands of the three providers. For example, a 2 GHz band used in the third generation mobile communication system may be used as the second frequency range. As described above, when using the FDD scheme, it is necessary to provide a separating band (center gap) between uplink frequency bands and downlink frequency bands to prevent interference between uplink and downlink. With the method of FIG. 1, it is necessary to provide the center gap in the frequency range of 3.4 GHz to 3.8 GHz (a 3.4-3.8 GHz band). Meanwhile, with the method of FIG. 2, it is not necessary to provide the center gap in the frequency range of 3.4 GHz to 3.8 GHz. This is because the gap between the first frequency range and the second frequency range functions as the center gap.

Accordingly, in FIG. 2, the first frequency range of 3.4 GHz to 3.8 GHz includes only the DL frequency bands of the first through third providers. Since it is not necessary to provide the center gap, the method of FIG. 2 makes it possible to more efficiently use the frequency range. In other words, the method of FIG. 2 makes it possible to use DL frequency bands with a wider bandwidth than that of FIG. 1.

First Embodiment

Figure 3:
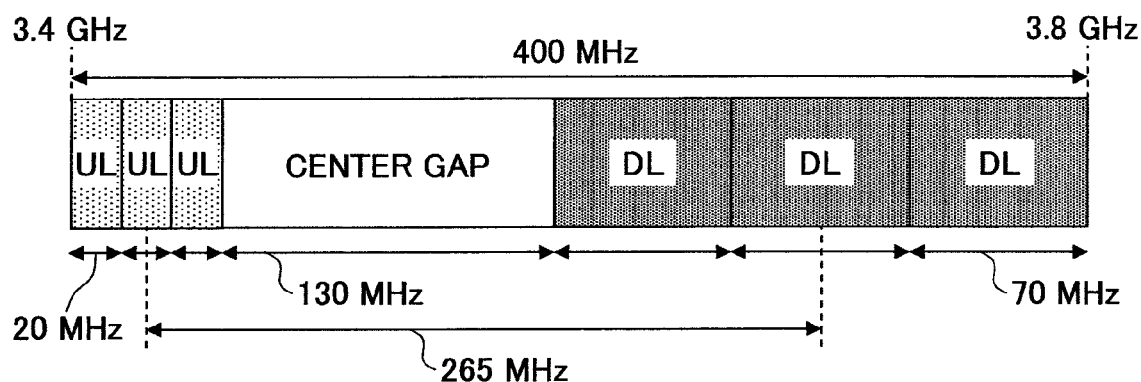
FIG. 3 is a drawing illustrating a case where a center gap is provided in the same frequency range by using numerical examples.

FIG. 3 is a drawing illustrating a method of using frequency bands by using numerical examples. FIG. 3 corresponds to FIG. 1 and is used as a comparative example. In FIG. 3, it is assumed that there are first, second, and third mobile communication providers providing mobile communication services using the FDD scheme. Each provider uses one of frequency bands for downlink (DL frequency bands) indicated by "DL" and one of frequency bands for uplink (UL frequency bands) indicated by "UL". A frequency band (center gap) for preventing interference between uplink and downlink is provided between the three UL frequency bands and the three DL frequency bands. The three UL frequency bands, the three DL frequency bands, and the center gap are provided in a frequency range of 3.4 GHz to 3.8 GHz.

The frequency bands assigned to the providers are called basic bandwidths or system bandwidths. In this example, each provider is assigned a basic frequency band of 20 MHz for uplink and a basic frequency band of 70 MHz for downlink. The center frequency of the entire frequency band for uplink is apart from the center frequency of the entire frequency band for downlink by 265 MHz.

The method of using frequency bands shown by FIG. 3 is provided as a comparative example from a technical point of view and is not necessarily in practical use.

Figure 4:
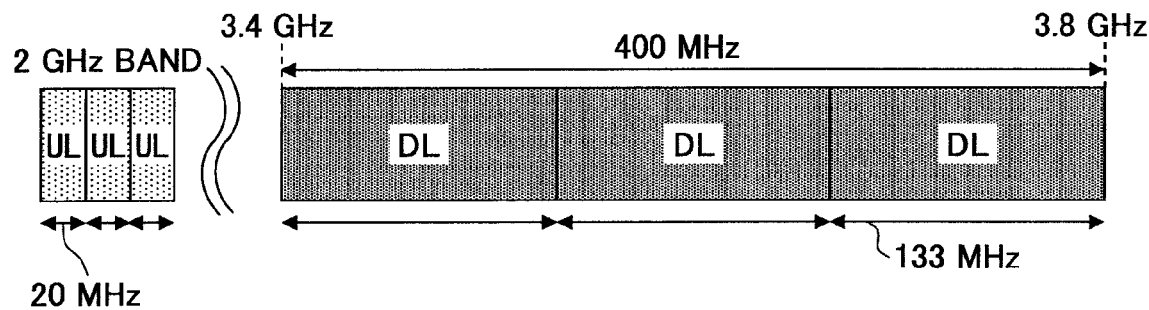
FIG. 4 is a drawing illustrating a method of using frequency bands according to the first embodiment by using numerical examples.

FIG. 4 is a drawing illustrating a method of using frequency bands according to the first embodiment. In FIG. 4, UL frequency bands of the three providers are in a second frequency range (2 GHz band) different from a first frequency range (3.4 GHz-3.8 GHz) containing DL frequency bands of the three providers. Similar to FIG. 3, each provider is assigned a basic frequency band of 20 MHz for uplink. However, different from FIG. 3, each provider is assigned a wide basic frequency band of 133 MHz for downlink. Since it is not necessary to provide the center gap in the first frequency range of 3.4 GHz to 3.8 GHz, the method of FIG. 4 makes it possible to more efficiently use the frequency range.

Also in FIG. 4, the UL frequency bands are provided in the second frequency range that is lower than the first frequency range for downlink. Generally, the path loss is smaller in a low frequency band than in a high frequency band. Therefore, using a lower frequency range (second frequency range) together with a higher frequency range (first frequency range of 3.4 GHz to 3.8 GHz) also makes it possible to achieve desired cell coverage.

Since the amount of uplink communications is generally less than the amount of downlink communications, a relatively narrow frequency band is sufficient for uplink. Also, a part of users of an older system using the 2 GHz band may switch to a newer system using the 3.4-3.8 GHz band. Therefore, even if uplink frequency bands for the newer system are set in the frequency range of the older system, it is possible to properly provide services in both the current and older systems.

Figure 5:
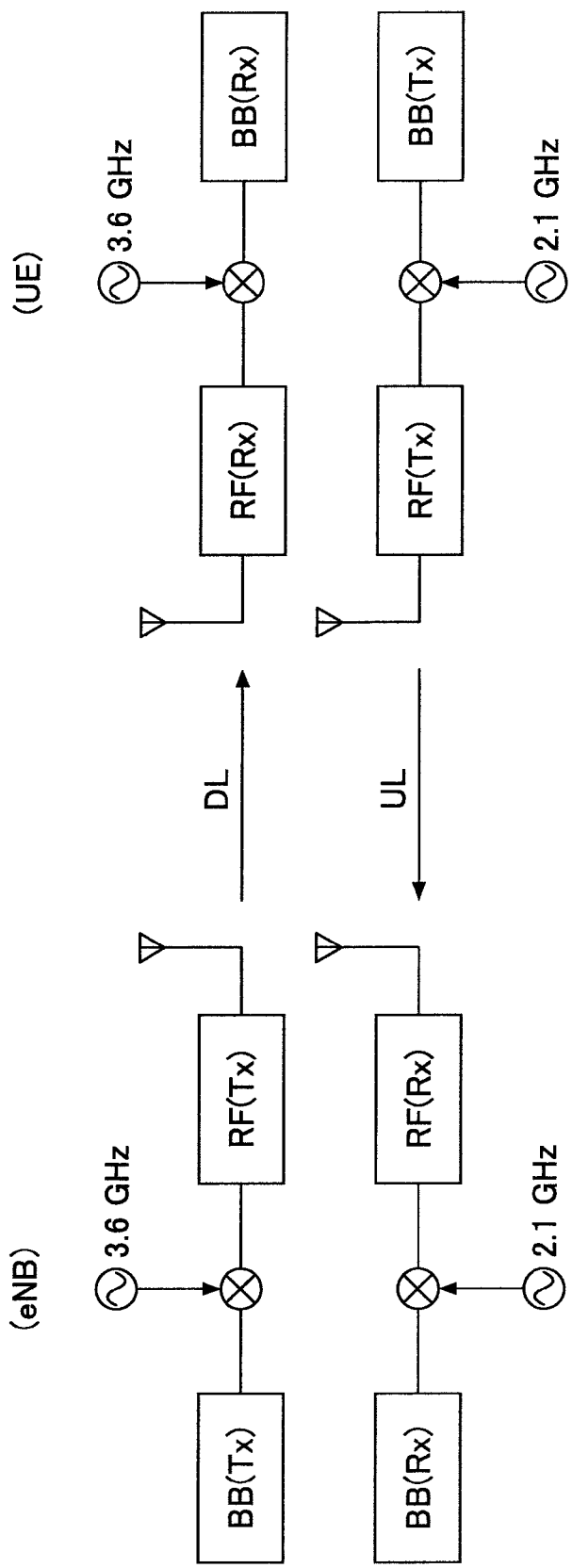
FIG. 5 is a drawing illustrating a base station and a user device according to the first embodiment.

FIG. 5 is a drawing illustrating a base station eNB and a user device UE according to the first embodiment. Here, it is assumed that the base station eNB and the user device UE belong to a mobile communication system using the frequency bands as shown in FIG. 4. More specifically, it is assumed that the base station eNB and the user device UE belong to a mobile communication system provided by one of the first through third providers described with reference to FIG. 4. The base station eNB includes a baseband processing unit BB (Tx), a frequency conversion unit, a radio transmission unit RF (Tx), and a transmitting antenna for a transmission signal; and a receiving antenna, a radio reception unit RF (Rx), a frequency conversion unit, and a baseband processing unit BB (Rx) for a received signal.

Similarly, the user device UE includes a baseband processing unit BB (Tx), a frequency conversion unit, a radio transmission unit RF (Tx), and a transmitting antenna for a transmission signal; and a receiving antenna, a radio reception unit RF (Rx), a frequency conversion unit, and a baseband processing unit BB (Rx) for a received signal.

The baseband processing unit BB (Tx) of the base station eNB generates a downlink signal. A downlink signal indicates either a control signal or a data signal. The downlink signal is up-converted by the frequency conversion unit into a signal with an appropriate frequency. In this example, the downlink baseband signal is converted into a high-frequency signal to be transmitted in the 3.4-3.8 GHz band. Processing such as filtering and amplification is performed on the converted signal and a radio signal in the 3.4-3.8 GHz band is transmitted from the transmitting antenna. When the radio signal in the 3.4-3.8 GHz band is received by the receiving antenna, the radio reception unit RF (Rx) of the user device UE performs processing such as filtering and amplification on the received signal. Next, the frequency conversion unit converts the processed signal into a baseband signal. Then, the baseband signal is processed by the baseband processing unit BB (Rx).

Meanwhile, the baseband processing unit BB (Tx) of the user device UE generates an uplink signal. An uplink signal indicates either a control signal or a data signal. The uplink signal is up-converted by the frequency conversion unit into a signal with an appropriate frequency. In this example, the uplink baseband signal is converted into a high-frequency signal to be transmitted in the 2 GHz band (the second frequency range other than the first frequency range of 3.4 GHz to 3.8 GHz). Processing such as filtering and amplification is performed on the converted signal and a radio signal in the 2 GHz band is transmitted from the transmitting antenna. When the radio signal in the 2 GHz band is received by the receiving antenna, the radio reception unit RF (Rx) of the base station eNB performs processing such as filtering and amplification on the received signal. Next, the processed signal is converted into a baseband signal by the frequency conversion unit. Then, the baseband signal is processed by the baseband processing unit BB (Rx).

Thus, in this embodiment, different frequency ranges (the 2 GHz band and the 3.4-3.8 GHz band) are used for uplink and downlink and the gap between the frequency ranges is used as a separating band. This approach makes it possible to improve the frequency efficiency. Also in this embodiment, uplink frequency bands are provided in a lower frequency range where the path loss is smaller. This approach makes it possible to achieve desired cell coverage.

Second Embodiment

As described above, when a higher frequency (carrier frequency) is used, the path loss generally becomes larger and the cell coverage generally becomes smaller. For example, compared with a case where a 2 GHz carrier frequency is used, the path loss increases by about 6 dB when a 3 GHz carrier frequency is used. Here, it is possible to improve the signal quality of a data channel to some extent by appropriately controlling the transmission rate. The transmission rate can be controlled, for example, by selecting a data modulation scheme, a channel coding rate (or data size), and a spreading ratio. Meanwhile, it is difficult to effectively control the transmission rate of a control channel by performing adaptive modulation and channel coding (AMC). Even if AMC is performed, unlike a data channel, it is difficult to effectively vary the transmission rate of a control channel. For this reason, in a second embodiment of the present invention, data channels are communicated (transmitted or received) using a high frequency and control channels are communicated (transmitted or received) using a low frequency.

Figure 6:
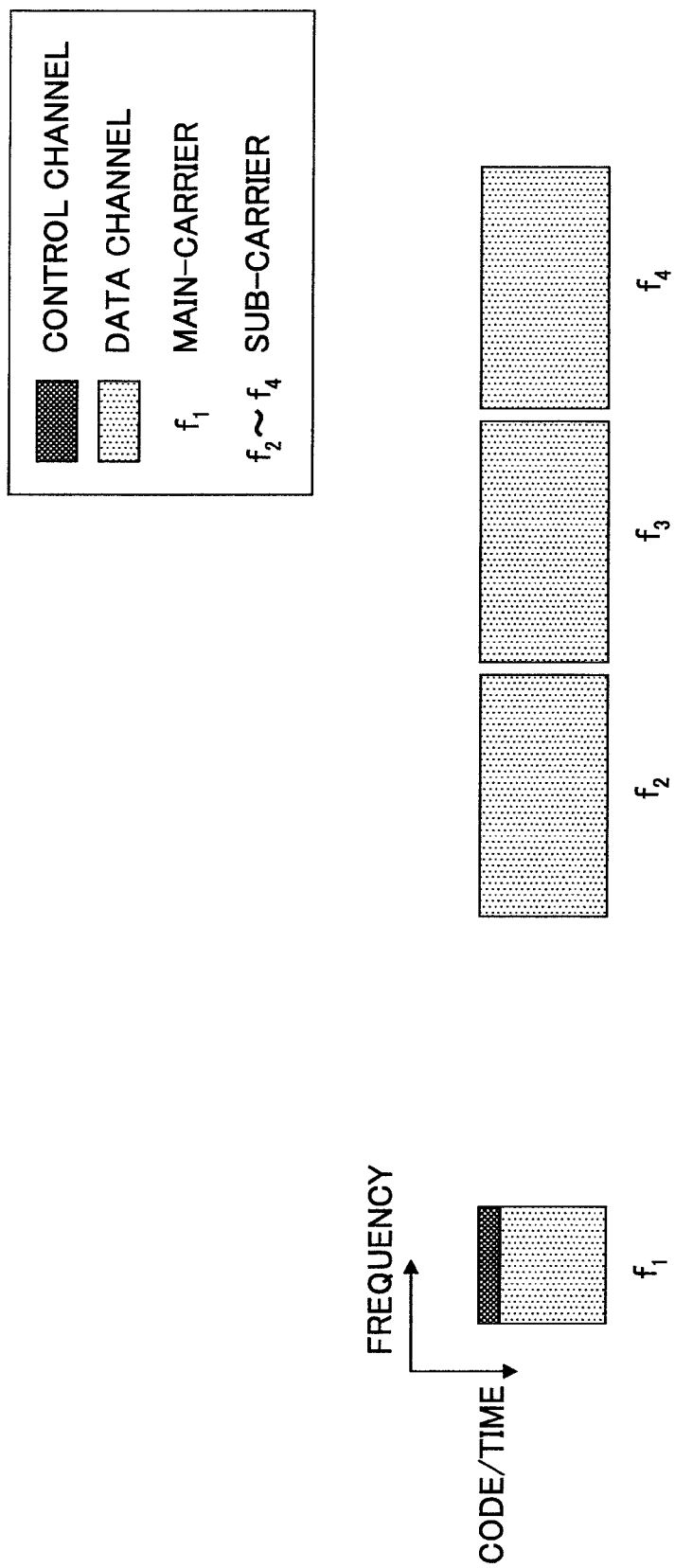
FIG. 6 is a drawing illustrating a method of using frequency bands according to a second embodiment of the present invention.

FIG. 6 is a drawing illustrating a method of using frequency bands according to the second embodiment. In FIG. 6, f1 through f4 indicate carrier frequencies (sub-carriers). The sub-carrier f1 is used to transmit basic control information that is essential for the system and called a main-carrier. The basic control information includes broadcast information (BCH), paging information (PCH), and/or random access information (RACH). The sub-carriers f2 through f4 are basic bandwidths assigned to the first, second, and third mobile communication providers. Each of the sub-carriers f2 through f4 has a bandwidth of, for example, 100 MHz. The bandwidth of the main-carrier f1 may be the same as or narrower than that of the sub-carriers f2 through f4. Any bandwidth sufficient to transmit the control information may be assigned to the main-carrier f1. Each provider may use a single-carrier scheme or a multicarrier scheme for communications. Control information other than the basic control information (e.g., BCH, PCH, and RACH) may be transmitted using the main-carrier f1 or the respective sub-carriers f2 through f4.

For example, the main-carrier f1 belongs to the 2 GHz band, and the sub-carriers f2 through f4 belong to the 3.4-3.8 GHz band. However, providing the main-carrier f1 and the sub-carriers f2 through f4 in different frequency ranges is not essential for this embodiment as long as the frequency band(s) for control channels is low enough to be able to achieve a wide coverage for the control channels. Although data channels are also transmitted in the main-carrier f1 in FIG. 6, this is not essential for this embodiment. For example, only control channels may be transmitted in the main-carrier f1 and data channels may be transmitted only in the sub-carriers f2 through f4.

Figure 7:
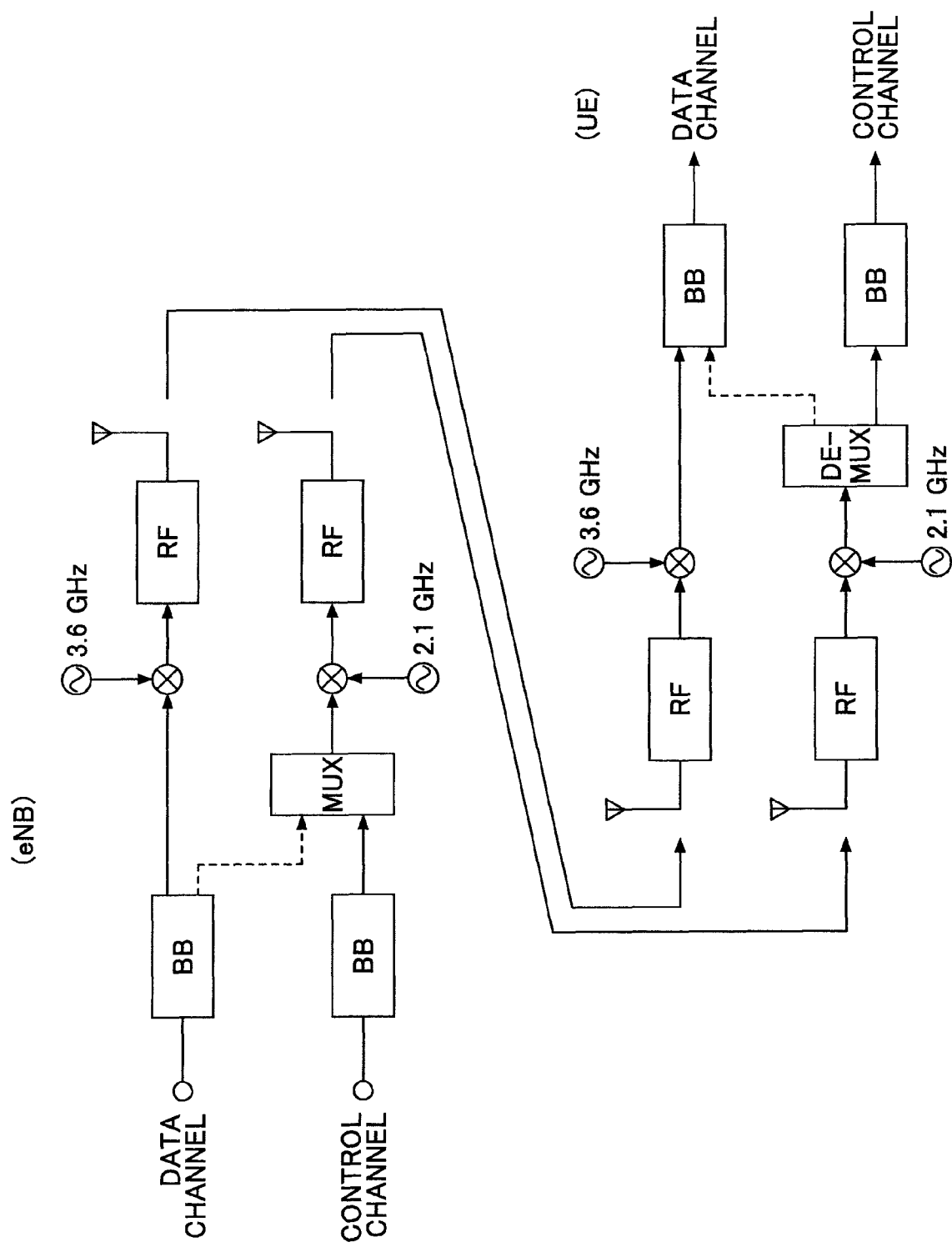
FIG. 7 is a drawing illustrating a base station and a user device according to the second embodiment.

FIG. 7 is a drawing illustrating a base station eNB and a user device UE according to the second embodiment. Here, it is assumed that the base station eNB and the user device UE belong to a mobile communication system using the frequency bands as shown in FIG. 6. More specifically, it is assumed that the base station eNB and the user device UE belong to a mobile communication system provided by one of the first through third providers described with reference to FIG. 6. The base station eNB includes a baseband processing unit BB for data channels, a baseband processing unit BB for control channels, a multiplexing unit MUX, frequency conversion units for high frequency and low frequency, radio units RF for high frequency and low frequency, and transmitting antennas for high frequency and low frequency.

The user device UE includes receiving antennas for high frequency and low frequency, radio units RF for high frequency and low frequency, frequency conversion units for high frequency and low frequency, a demultiplexing unit DE-MUX, a baseband processing unit BB for data channels, and a baseband processing unit BB for control channels.

The baseband processing unit BB (for data channels) of the base station eNB generates a downlink data channel. Appropriate data modulation and channel coding are applied to the downlink data channel according to adaptive modulation and channel coding (AMC). Next, the downlink data channel is up-converted by the frequency conversion unit into a signal with an appropriate frequency. In this example, the downlink baseband signal is converted into a high-frequency signal to be transmitted in the 3.4-3.8 GHz band. Processing such as filtering and amplification is performed on the converted signal and a radio signal in the 3.4-3.8 GHz band is transmitted from the transmitting antenna.

The baseband processing unit BB (for control channels) of the base station eNB generates a downlink control channel(s). The downlink control channel(s) includes, for example, a broadcast channel (BCH), a paging channel (PCH), and/or a random access channel (RACH). The downlink control channel is multiplexed with a data channel by the multiplexing unit MUX if necessary (typically, the channels are multiplexed by time-division multiplexing; however, a different multiplexing scheme may be used instead of or in combination with time-division multiplexing). A signal including the downlink control channel is up-converted by the frequency conversion unit into a signal with an appropriate frequency. In this example, the downlink baseband signal is converted into a signal to be transmitted in a frequency range (e.g., the 2-GHz band) lower than the 3.4-3.8 GHz band. Processing such as filtering and amplification is performed on the converted signal and a radio signal in the 2 GHz band is transmitted from the transmitting antenna.

When the radio signal in the 3.4-3.8 GHz band is received by the receiving antenna, the radio unit RF (for high frequency) of the user device UE performs processing such as filtering and amplification on the received signal. The processed signal is converted by the frequency conversion unit into a baseband signal. The baseband signal is processed by the baseband processing unit BB (for data channels) and the data channel is restored. Appropriate data demodulation and channel decoding are performed on the downlink data channel according to the data modulation and channel coding schemes that have been applied to the downlink data channel according to adaptive modulation and channel coding (AMC).

When the radio signal in the 2 GHz band is received by the receiving antenna, the radio unit RF (for low frequency) of the user device UE performs processing such as filtering and amplification on the received signal. The processed signal is converted by the frequency conversion unit into a baseband signal. The baseband signal is separated into a data channel and a control channel if necessary. The control channel is processed by the baseband processing unit BB (for control channels) and the control channel is restored.

Thus, in the second embodiment, a control channel is transmitted using a lower frequency band and a data channel is transmitted using a higher frequency band. This approach makes it possible to achieve desired cell coverage.

INDUSTRIAL APPLICABILITY

The present invention may be applied to any mobile communication system where a higher frequency range and a lower frequency range that are apart from each other are used for communications. For example, the present invention may be applied to an HSDPA/HSUPA W-CDMA system, an LTE system, an IMT-Advanced system, a WiMAX system, and a Wi-Fi system.

The present invention is not limited to the specifically disclosed embodiments, and variations and modifications may be made without departing from the scope of the present invention. Although the 3.4-3.8 GHz band is used as an example of the higher frequency range in the above embodiments, any other appropriate frequency band may be used as the higher frequency range. Although the 2 GHz band is used as an example of the lower frequency range in the above embodiments, any other appropriate frequency band may be used as the lower frequency range. In other words, any two frequency ranges that are respectively higher and lower relative to each other may be used. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although functional block diagrams are used to describe apparatuses in the above embodiments, the apparatuses may be implemented by hardware, software, or a combination of them.

The present international application claims priority from Japanese Patent Application No. 2008-120660 filed on May 2, 2008, the entire contents of which are hereby incorporated herein by reference.

EXPLANATION OF REFERENCES eNB Base station
UE User device
BB Baseband processing unit
RF Radio unit
MUX Multiplexing unit
DE-MUX Demultiplexing unit

The invention claimed is:

1. A communication apparatus comprising:
   a first communication unit; and
   a second communication unit,
   wherein the communication apparatus is configured for a newer system in an area where an older system and the newer system coexist, the older system using a system frequency band with a basic bandwidth, and the newer system using a system frequency band wider than the basic bandwidth and employs a frequency division duplex scheme for communications;
   wherein the first communication unit is configured to communicate at least a downlink data channel of the newer system using a frequency band belonging to a first frequency range,
   wherein the second communication unit is configured to communicate at least an uplink control channel of the newer system using a frequency band belonging to a second frequency range that is separate from the first frequency range and lower than the first frequency range, and
   wherein the second frequency range is used for uplink and downlink communications in the older system,
   wherein the older system is a Long Term Evolution (LTE) system and the newer system is a successor system to the LTE system.

2. The communication apparatus as claimed in claim 1, wherein a downlink control channel of the newer system is communicated using a frequency band belonging to the first frequency range; and an uplink data channel of the newer system is communicated using a frequency band belonging to the second frequency range.

3. The communication apparatus as claimed in claim 1, wherein at least a part of downlink control channels of the newer system are communicated using a frequency band belonging to the second frequency range; and an uplink data channel of the newer system is communicated using a frequency band belonging to the first frequency range.

4. The communication apparatus as claimed in claim 3, wherein the part of the downlink control channels includes one or more of a broadcast channel, a paging channel, and a random access channel.

5. A communication method performed by a communication apparatus, the method comprising the steps of:

communicating, by a first communication unit of the communication apparatus, at least a downlink data channel of a newer system using a frequency band belonging to a first frequency range; and communicating, by a second communication unit of the communication apparatus, at least an uplink control channel of the newer system using a frequency band belonging to a second frequency range that is separate from the first frequency range and lower than the first frequency range, wherein the communication apparatus is configured for the newer system in an area where an older system and the newer system coexist, the older system using a system frequency band with a basic bandwidth, and the newer system using a system frequency band wider than the basic bandwidth and employs a frequency division duplex scheme for communications, and wherein the second frequency range is used for uplink and downlink communications in the older system, wherein the older system is a Long Term Evolution (LTE) system and the newer system is a successor system to the LTE system.

6. A communication system, comprising:

an older system using a system frequency band with a basic bandwidth;

a newer system using a system frequency band wider than the basic bandwidth and employing a frequency division duplex scheme for communications; and a communication apparatus used in an area where the older system and the newer system coexist, the older system using a system frequency band with a basic bandwidth, and the newer system using a system frequency band wider than the basic bandwidth and employs a frequency division duplex scheme for communications, wherein the communication apparatus comprises:

a first communication unit communicating at least a downlink data channel of the newer system using a frequency band belonging to a first frequency range, a second communication unit communicating at least an uplink control channel of the newer system using a frequency band belonging to a second frequency range that is separate from the first frequency range and lower than the first frequency range, wherein the second frequency range is used for uplink and downlink communications in the older system, wherein the older system is a Long Term Evolution (LTE) system and the newer system is a successor system to the LTE system.

\* \* \* \* \*